Figure 1:
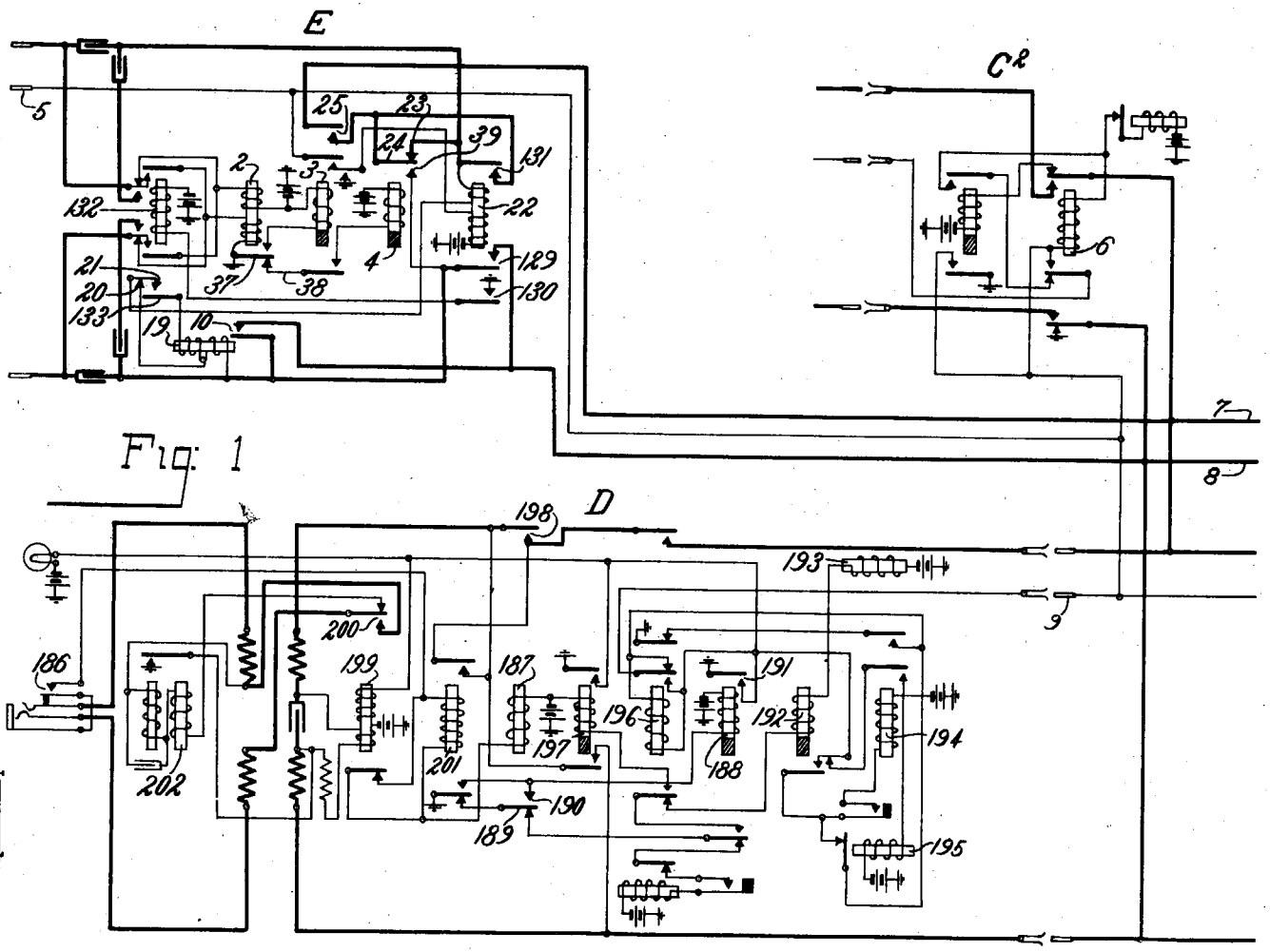

Dec. 17, 1929. E. JACOBSEN Re. 17,526

AUTOMATIC TELEPHONE SYSTEM

Original Filed April 15, 1918 3 Sheets-Sheet 1

Inventor
Emil Jacobsen
Wm Walter Dorw. Atty.

Dec. 17, 1929. E. JACOBSEN Re. 17,526

AUTOMATIC TELEPHONE SYSTEM

Original Filed April 15, 1918 3 Sheets-Sheet 2

Inventor
Emil Jacobsen
Wm Walter Crow Atty.

Dec. 17, 1929. E. JACOBSEN Re. 17,526

AUTOMATIC TELEPHONE SYSTEM

Original Filed April 15, 1918 3 Sheets-Sheet 3

Inventor
Emil Jacobsen
By Walter Carson Atty.

Reissued Dec. 17, 1929

Re. 17,526

UNITED STATES PATENT OFFICE

EMIL JACOBSEN, OF PLANDOME, NEW YORK, ASSIGNOR, BY MESNE ASSIGNMENTS, TO AUTOMATIC ELECTRIC INC., OF CHICAGO, ILLINOIS, A CORPORATION OF DELAWARE

AUTOMATIC TELEPHONE SYSTEM

Original application filed April 15, 1918, Serial No. 228,546. Renewed March 16, 1923. Original No. 1,525,995, dated February 10, 1925. Application for reissue filed January 28, 1926. Serial No. 84,524.

My invention relates in general to a telephone system in which connections are established by subscribers without the intervention of an operator, by the use of automatic switches.

More specifically my invention relates to an improved method and apparatus for permitting a called subscriber in a branch exchange to transfer a call from his line to some other line in the branch exchange. This invention is especially adapted to a system in which there are more than one hundred subscribers in the branch exchange and in which both selectors and connectors are used to find a called line in said exchange.

Other systems have been invented by myself and others which show means for extending or passing the call in a system of one hundred lines or less in which only connector switches are used, but this is the first time that such a scheme has been applied to a larger system. By passing or transferring a call, I mean the act of a called subscriber, who, after being called, may connect the party calling him with any other subscriber without the necessity of any operation by the calling line. This invention is especially useful in a system where a subscriber may seize a trunk line leading to a branch exchange and establish a connection to a subscriber in the branch exchange thereover, now, instead of the calling subscriber having to hang up his receiver, consult the directory, and then call again through all the switches to a second subscriber in the same branch exchange, he may simply inform the first called subscriber that he desires to speak with a certain other subscriber, and the first called party may then operate certain switches, local to the branch exchange. to switch the connection to the second called party from the same trunk line which was seized by the calling party. The second called party may in turn extend the call to a third subscriber and so on, so that any number of calls may be made without losing the trunk line with which connection was first established.

In order to accomplish this, I have provided a so-called dual or compound selector switch, consisting of two selectors at the end of an incoming trunk line of an exchange, which are used to extend connections from said trunk line through connector switches to called lines in this exchange.

When a call is set up to this trunk line, one of said selectors which may be termed the main selector, is always operated by the digit of a called number to establish a connection to one of a number of connector switches in the usual manner, which connector is then operated to connect with the called line. Now if the called subscriber is not the party desired or if another party is desired, the calling party may inform this first called party of the number of the party desired so that the called man may then extend the call to this second called subscriber. The back bridge relay of the main selector is so arranged that when the first called subscriber now operates his dial to send the digits of the second called subscriber's number, this relay will control the operating magnets of the other selector (called the auxiliary selector) to pick out another connector switch in the branch exchange to connect with the second called subscriber's line. The second called subscriber may then extend the call again by operating the main selector to find a third called party and so on. In this scheme it is only necessary for the called party to dial a three digit number, while, if such a scheme were not provided, the calling subscriber would have to release the entire connection, which might have passed through any number of switches before reaching the inter-exchange trunk line, and then dial perhaps five or six digits to again connect with the inter-exchange trunk line to call another party in the branch. In the present case I have arranged the circuits so that the three parties (calling man and first and second called man) may stay in together if desired, while if the first called man hangs up, the selector and connector used to establish connection with his line will be released. I have also arranged the circuit so that a weak tone will be applied to the talking circuit as long as three men stay in on a connection; so that, if two subscribers desire to communicate secretly, a third subscriber's presence in the connection will be known by them; and the tone is removed only when one of the called men hangs up. This tone is so weak as not to interfere with conversation, so that the three men may stay in and talk without any inconvenience from the tone.

In order to accomplish the desired results, I have taken certain functions usually performed by the connector switch and placed them under control of the selector switch, the controlling relays being in the selector in place of the connector.

Having described the general objects of my invention and the manner of obtaining these results, I will now describe my invention by referring to the accompanying drawings in which my invention has been illustrated in connection with an automatic system of the latest type, in which local and long distance connections may be established automatically.

Figure 2:
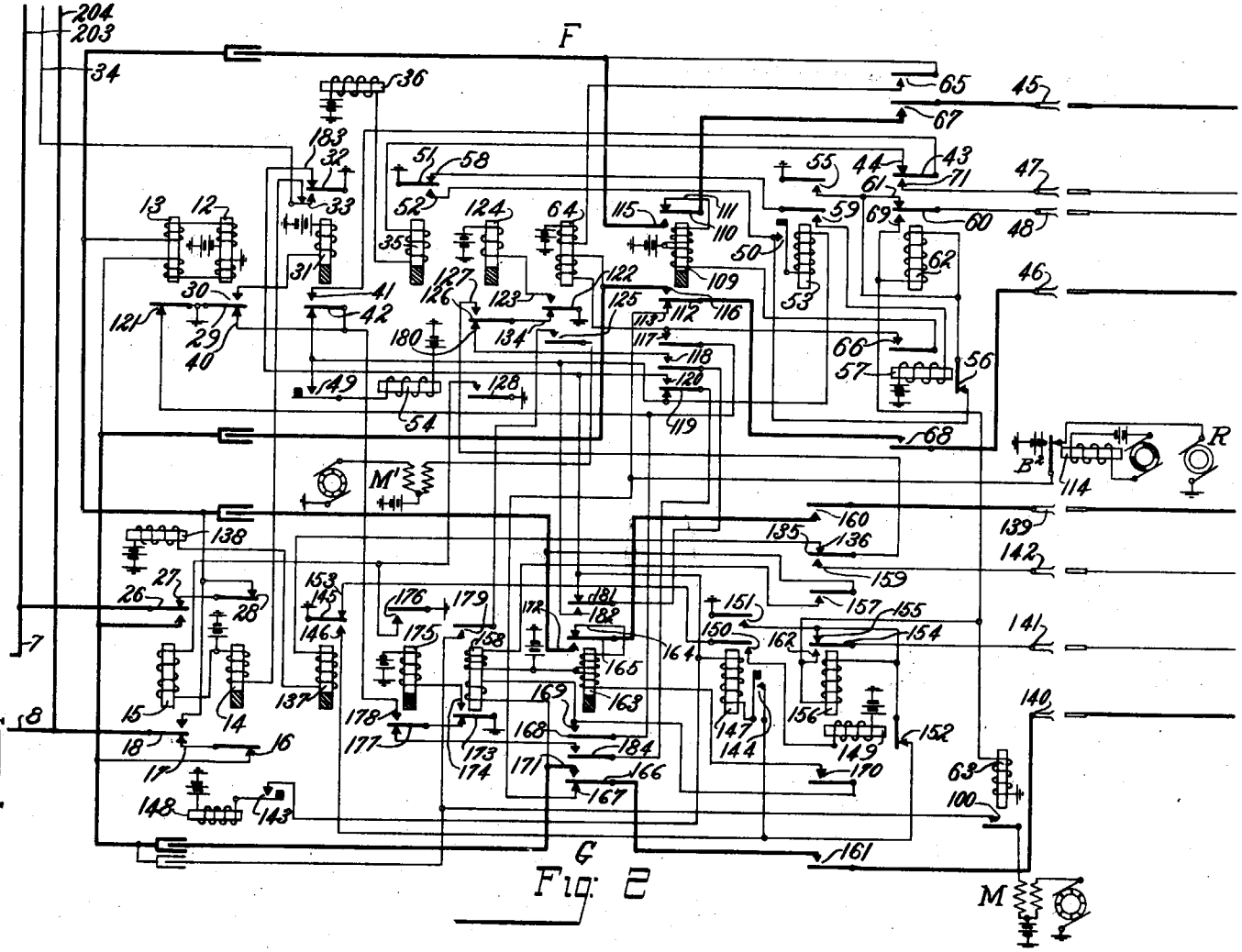

In Figure 1, I have shown a repeater E in the main exchange which is accessible to a local subscriber or an operator in the main exchange and which is used in either case to repeat impulses over the two way trunk line extending to a branch exchange. This trunk line also terminates in the main exchange in a line switch $C^2$ which is operated over the trunk line to extend a connection through the usual selectors and connectors to a called line in the main exchange when the trunk line is seized by a selector at the branch exchange to call from branch to main. This trunk line also terminates in the main exchange in a plurality of selector repeaters similar to that shown at D (Fig. 1) which are accessible to a long distance operator preferably. The trunk line terminates in the branch exchange in a pair of selectors (Fig. 2) which are connected in multiple to the trunk line and may be termed the main selector F and the auxiliary selector G. The trunk line is also multipled into the banks of outgoing selectors in the branch exchange as shown.

Figure 3:
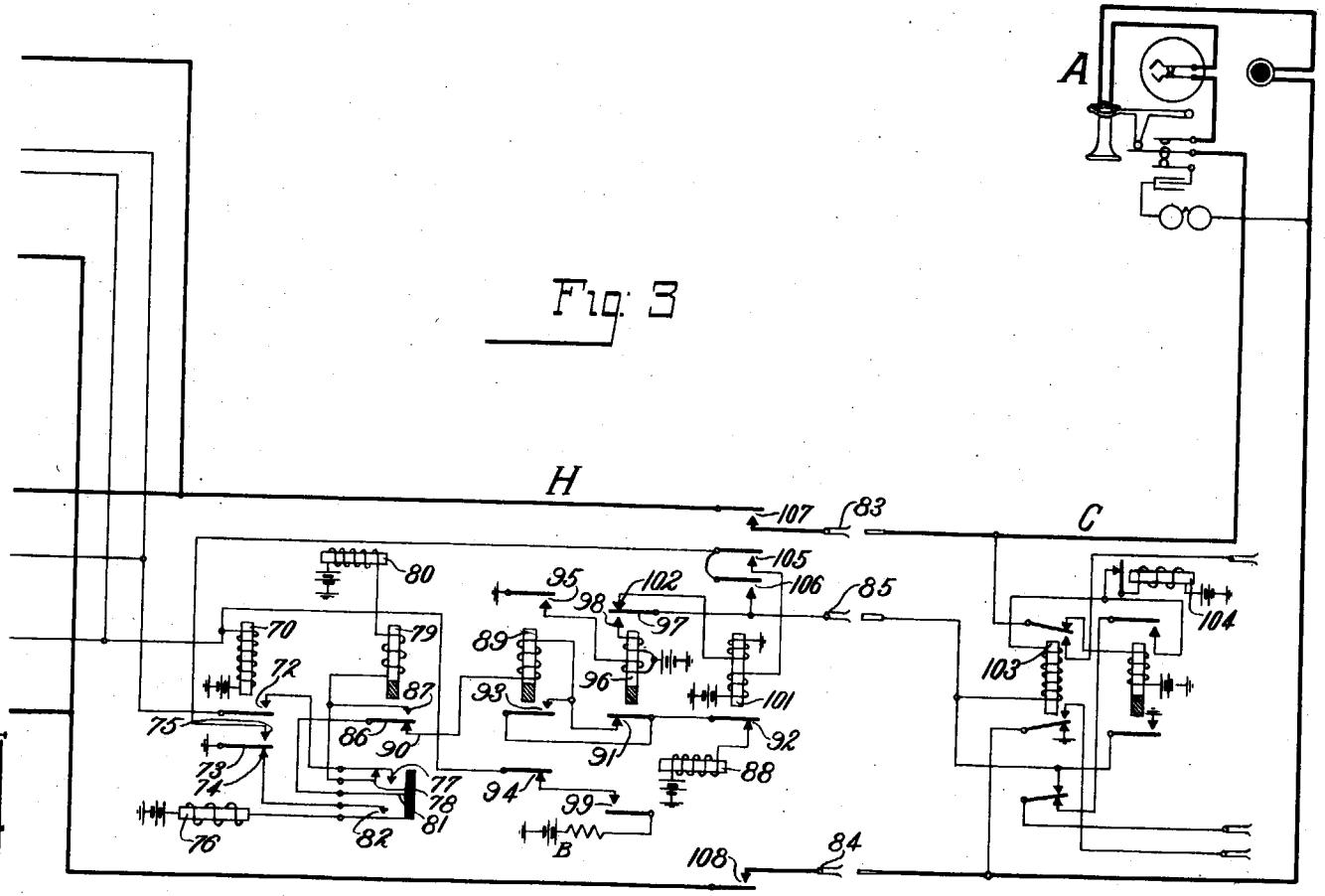

The selectors F and G have access in common to a plurality of connector switches similar to that shown at H (Fig. 3), so that either selector may seize any idle connector switch to call any subscriber in this branch exchange. I have shown a plurality of batteries throughout the drawings, but it is to be understood that there is preferably but one battery for each exchange.

I will first describe the operations when a subscriber in the main exchange seizes the repeater E and its associated trunk line to extend a connection to a subscriber in the branch exchange.

When a call is extended to the repeater E a circuit is closed in the usual manner for the line relay 2 of said repeater over the two sides of a calling line in series. Relay 2, upon energizing, closes a circuit for the slow relay 3 to ground the release trunk and prepare a circuit for the slow relay 4. The ground which is connected to the release trunk makes the repeater E busy at contact 5 and its multiples, causes the bridge cut-off relay 6 of the line switch $C^2$ to be energized part way and also makes the trunk line 7—8 busy at contact 9 in the bank of the selector repeater D and to others at its multiples.

The energization of relay 2 also closes a circuit at springs 10 which is completed a second later at springs 25 of relay 3 for the line relay of the main selector switch F (Fig. 2), said circuit extending from ground through the lower winding of line relay 12 of the selector F, lower winding of relay 13, springs 16 of relay 14, springs 17 and 18 of relay 15, trunk conductor 8, springs 10, right hand winding of coil 19, springs 20 and 21, upper winding of relay 22, springs 23 and 24, springs 25 of relay 3, trunk conductor 7, springs 26 and 27, springs 28, and upper windings of relays 13 and 12 to battery.

The line relay 12 energizes over the above traced circuit in the usual manner to close a circuit at springs 29 and 30 for the release relay 31, which in turn energizes to prepare a circuit for the vertical magnet and to ground the multipled release trunk 34 from ground through springs 32 and 33 to the banks of outgoing selector switches. The relay 13 which is in series with the relay 12 is a differential relay and does not energize in the above traced circuit.

Now when the calling device of the calling subscriber is operated to open the line circuit a number of times in accordance with a digit of the called number, the line relay 2 of repeater E will deenergize a corresponding number of times to repeat said impulses to the selector switch F over the inter-office trunk line 7—8. The slow relay 4 energizes and remains energized during the operation of relay 2 due to the intermittent ground applied to its circuit from ground through springs 37 and 38. The relay 4, while energized, operates to short circuit the windings of relay 22 and coil 19 to reduce the resistance of the repeating circuit to the line relay 12. The circuit over which the relay 12 receives impulses extends therefore from ground through the lower winding of said relay over the previously traced circuit to trunk conductor 8, through springs 10, springs 39 and 24, springs 25, trunk conductor 7, and as previously traced through the upper winding of said relay to battery.

The relay 3 has previously closed a circuit for the electropolarized relay 22 which has not energized up to this time as it requires both windings to be energized in the same directions before it will attract its armatures.

The line relay 12, upon each deenergization over the above circuit, operates to close a circuit for the slow relay 35 and vertical magnet 36 in series, from ground through springs 29 and 40, springs 42 and 41, springs 43 and 44, relay 35, and magnet 36 to battery. The magnet 36 is operated to raise the wipers 45—48 to some level of the banks, in which are located connectors, which have access to a desired group of lines. As soon as the wipers leave their normal position the springs 49 and 50 close contact to prepare certain circuits. The relay 35, upon energizing, closes a circuit from ground through springs 51 and 52, off-normal springs 50, relay 53, off-normal springs 49, and release magnet 54 to battery. The magnet 54 does not energize over this circuit due to the high resistance of relay 53. Relay 53, however, energizes to lock itself energized to ground through springs 55 and 56 and to prepare a circuit for the rotary magnet 57. As soon as relay 35 falls back after the impulses to the vertical magnet cease, the above prepared circuit for the rotary magnet is completed from ground through springs 51 and 58, springs 59, and rotary magnet 57 to battery. The magnet 57 therefore energizes to step the wipers 45—48 onto the first set of contacts in the selected level and also opens the locking circuit of the interrupter relay 53 at springs 56. Relay 53 will immediately fall back and open the rotary magnet circuit at springs 59. When the magnet 57 deenergizes at this time a new circuit is prepared for the interrupter relay 53 extending from the test wiper 48, through spring 60 and 61, springs 56, springs 50, relay 53, off-normal springs 49 and relay 54 to battery. Now if the first trunk line of this level, on the test contact of which the wiper 48 now rests, is busy, a ground will be present on said contact and relay 53 will energize again over the above traced circuit from said ground to again close the circuit of rotary magnet 57 at springs 59 and cause said magnet to rotate the wipers to the next set of contacts which are tested in the same manner. This alternate operation of relay 53 and magnet 57 continues until an idle trunk line leading to a connector H (Fig. 3) is found, at which time there will be no ground present on the contact tested by wiper 48 and relay 53 will not be again energized to close the circuit of the rotary magnet. It will be noticed that during the rotation of the wipers in search of an idle trunk line, the wiper cut-on relay 62 has been short circuited by the ground on successive busy contacts through the wiper 48, now however, when an idle trunk line is reached, the relay 62 is no longer short circuited and will energize over a circuit extending from ground through the common low wound busy relay 63, relay 62, and over the previously traced circuit through relay 53 and magnet 54 to battery. Relay 62 is of comparatively high resistance and does not permit any relay or magnet except itself to energize over this circuit. Relay 62, upon energizing, over this circuit, prepares a circuit for the back bridge relay 64 at the springs 65 and 66, prepares the ringing circuit at springs 67 and 68, connects ground through relay 63, through springs 69 and 60 and wiper 48, through the relay 70 of the connector H to battery, opens the circuit of the vertical magnet 36 at springs 43 and 44 and prepares a repeating circuit at springs 43 and 71 to the magnets of connector H. The ground through relay 63 to wiper 48 acts as a guarding potential for the connector H in the banks of other selectors such as the selector G (Fig. 2) and maintains the connector busy. The relay 70 of the connector H energizes over the above circuit including relay 63 to prepare a circuit at springs 72 for the operating magnets, opens the circuit of release magnet 76 at springs 73 and 74, and prepares another circuit at springs 73 and 75 for the wiper cut-on relay to be described later.

The calling subscriber may now operate his calling device for the next digit of the called subscriber's number, thereby causing the line relay 12 to again vibrate in response to the said impulses. The impulses are in this case repeated by the line relay 12 to the magnet of connector H over the following circuit, ground through springs 29 and 40, springs 41 and 42, springs 43 and 71, wiper 47, springs 72, springs 77 and 78, relay 79, and vertical magnet 80 to battery. This series of impulses causes relay 79 to remain energized during the transmission thereof and operates magnet 80 to step the wipers 83, 84 and 85 to a desired level of contacts in the bank. As soon as the wipers take their initial step at the first impulse, the off-normal springs operate to close a point in the circuit of release magnet 76 at springs 82, open the initial energizing circuit of relay 79 and magnet 80 at springs 77 and 78 and close a new energizing circuit for said coils at springs 77 and 81. The rest of the vertical impulses therefor pass through said springs 77 and 81, through the springs 86 and 87, closed by relay 79, through said relay 79 and magnet 80 to battery.

As soon as the impulses for this digit cease, the relay 79 deenergizes to prepare a circuit for the rotary magnet 88 and slow relay 89 at springs 86 and 90. The relay 12, therefore, in response to the last digit of the called number, operates to repeat said impulses over the previously traced circuit to springs 72, from thence through springs 77 and 81, springs 86 and 90, relay 89, springs 91 and 92, and rotary magnet 88 to battery. The operation of the magnet 88 causes the wipers 83, 84 and 85 to be rotated onto the contacts which are connected to the desired line leading in this case to the substation A. The relay 89 remains energized, being slow acting, during this series of impulses, to short circuit the springs 91 at springs 93, open the busy control circuit at springs 94, and closes a circuit for busy relay 96 at springs 95. Relay 96 therefore energizes and remains energized for an instant after the wipers come to rest on the desired line, to test the same. If the called line be busy and a ground present at the test contact, then relay 96 will be locked energized by said ground through the wiper 85 and springs 97 and 98 to battery through its upper winding. Relay 96, upon energizing, opens the circuit of the rotary magnet at springs 91, and closes the busy control circuit at springs 99. As soon now as relay 89 falls back after the cessation of impulses to the rotary magnet, the busy control circuit is completed at springs 94 and extends from battery B through a resistance of approximately 200 ohms, through springs 99 and 94, wiper 48, springs 60 and 69, and relay 63 to ground. The relay 63 receives enough current to attract its armature in this case and operates to connect busy signaling current from busy machine M through springs 100 to the trunk conductor 8 and thence to the calling subscriber. The calling subscriber upon hearing this busy tone may then hang up his receiver and release the connection in the usual manner.

Assuming now that the substation A were idle when called, then when relay 96 of connector H energizes after connection is made with said line it will have no locking circuit closed for its upper winding and as soon as relay 89 falls back after impulses cease and opens springs 95, relay 96 will deenergize and prepare a circuit for the wiper cut-on relay 101, extending from ground through the upper winding of said relay, springs 102 and 97, test wiper 85, bridge cut-off relay 103 of the line switch C, and magnet 104 to battery. Relays 101 and 103 only energize over this circuit, relay 103 attracting its armatures only far enough to disconnect ground and the operating magnets of switch C from the called line, without connecting said line to the wipers. Relay 101, upon energizing, opens the circuit of the rotary magnet at springs 92, closes a locking circuit for its own lower winding at springs 105, connects ground direct to wiper 85 through springs 106, and connects the called line conductors through to the ringing circuit at springs 107 and 108 to signal the called station. The circuit for ringing the called station instead of being from the connector as is usual to automatic systems extends from the selector over the following path, from battery through the upper winding of relay 109, through springs 111 and 110, springs 67, wiper 45, springs 107, wiper 83, to and through the ringing equipment of substation A, and back through wiper 84, springs 108, wiper 46, springs 68, springs 112 and 113, to the armature of the interrupter relay 114, which relay operates to connect said circuit first to the generator R and then to the booster battery $B^2$.

The called subscriber upon hearing his call signal removes his receiver in response thereto and closes a direct current circuit for the relay 109 through the receiver hook springs. The relay 109 will immediately energize over this circuit and disconnect the ringing circuit from the called line at springs 112 and 113, and 110 and 111. Further results of the energization of relay 109 are as follows; the talking circuit from the called line is connected to the windings of the back bridge relay 64 through springs 110 and 115, and springs 112 and 116; the closure of springs 117 and 118 closes a locking circuit for the lower winding of relay 109 extending from ground through springs 121 of relay 13, springs 117 and 118, springs 66, and the lower winding of said relay 109 to battery; this ground is also connected to one end of the lower winding of back bridge relay 64. The relay 64 is now energized over a circuit extending from ground through springs 121, springs 117 and 118, lower winding of relay 64, springs 116 and 112, springs 68, wiper 46, springs 108, wiper 84, through the talking equipment of substation A, and back over the other side of the line through wiper 83, springs 107, wiper 45, springs 67, springs 110 and 115, springs 65, and upper winding of relay 64 to battery. This relay therefore supplies talking battery to the called subscriber and also energizes to close a circuit at springs 122 and 123 for the slow acting relay 124, and to close one point in a signaling circuit at springs 125. The relay 124 energizes to prepare a circuit for the operating magnets of the auxiliary selector G at springs 126 and 127 and also closes a circuit at springs 128 from ground through said springs through relay 15 to battery. Relay 15 will therefore energize to reverse the connections of the line relay 12 with regard to the trunk conductors 7 and 8, thereby reversing the flow of current flowing over said trunk conductors to the winding of the relay 22 of the repeater E. Relay 22, being an electro-polarized relay as before pointed out, will now energize with the following results: The springs 129 close contact to short circuit the impulsing springs 10 of the line relay, the springs 131 close contact to short circuit the springs 23 and 24, and springs 130 close contact to energize the reversing relay 132, which in turn energizes to reverse the flow of battery in the calling line for any desired purpose and to open the contact of springs 20 and 21 and close contact of springs 21 and 133. The holding circuit of the line relay 12 through the repeater now extends from the trunk conductor 8 through springs 129, both windings of coil 19 in series, upper winding of relay 22, springs 131, and springs 25 to the trunk conductor 7. The calling and called subscribers may now converse over the heavy conductors shown extending through repeater E, selector F, and connector H.

When conversation is completed the connection may be released by the hanging up of the receiver at the calling station. Relay 2 of repeater E will therefore deenergize and through the medium of relay 3 will open the holding circuit for the line relay 12 of selector F in the usual manner. Relay 12 in turn deenergizes to open the circuit of slow relay 31, which in turn deenergizes to remove ground from the release trunk and close a circuit for the release magnet 54 at the back contact of spring 42. This switch F will therefore immediately release and open the circuit of the holding relay 70 of the connector H. Relay 70, upon deenergizing, closes a point at springs 73 and 74, in the circuit of the release magnet 76, thereby causing the release of the connector and thus the entire connection is released.

Let us assume now that the calling subscriber, who has directed the extension of the previously described connection, desires to talk with some other subscriber in the same branch exchange with the subscriber A. In the old practice the calling subscriber would be obliged to release the entire connection and again go through the entire process of seizing a repeater E and another trunk line similar to 7—8, and so on, and in the case of a busy branch exchange the inter-office trunks lines might be so busy that he would have to wait some time before his second call could be completed. In my improved system, as explained, I have arranged the circuits so that the calling subscriber need not release the entire connection, but need only inform the called subscriber of the other partly to whom he desires to converse and the called party may then extend this connection to said desired party by operating the auxiliary selector G and some other connector switch similar to H to find the desired called line, that is, only three digits will be required for such extension of the connection.

I will now describe the operations which are performed by the called subscriber at substation A when the calling subscriber, before releasing the above described connection, requests said subscriber A to transfer the call for him to some other party. When the called subscriber receives such a request he operates his calling device to control first the auxiliary selector G (Fig. 2) and then some other connector in the following manner: When the calling device of substation A is operated for the first digit of the desired called subscriber's number the previously traced circuit of the relay 64 in series with the called line is interrupted a number of times in the same manner in which the line relay 2 of the repeater E was operated by the calling subscriber. Each time the relay 64 falls back it closes a circuit for the vertical magnet of the auxiliary selector which was previously prepared by the slow relay 124, this circuit extends from ground through springs 122 and 134, springs 126 and 127, springs 135 and 136, slow relay 137, and vertical magnet 138 to battery. The vertical magnet 138 operates in the usual manner to raise the wipers 139, 140, 141 and 142 to some level of the bank in which connectors are located having access to the group of lines in which the called subscriber is located. As soon as said wipers leave normal position, the off-normal springs 143 and 144 are operated to prepare certain circuits. The relay 137 holds in energized position during the operation of magnet 138 and in this position, closes a circuit at springs 145 and 146 extending through springs 144, relay 147, springs 143, and magnet 148 to battery. Only the relay 147 energizes over this circuit and said relay 147 prepares a circuit for the rotary magnet 149 at springs 150, and closes a locking circuit for itself at springs 151 extending through the springs 152 of the rotary magnet. After the vertical impulses cease, the circuit of relay 137 is opened by the relay 64, said relay 137 therefore deenergizes after an instant and completes the circuit for the rotary magnet 149 from ground through the springs 145 and 153, and the springs 150. The rotary magnet 149 will therefore energize immediately to step the wipers 139—142 inclusive onto the first set of contacts of the selected level and also opens the holding circuit of relay 147 at springs 152. Relay 147 will therefore deenergize and in turn open the circuit of the rotary magnet at springs 150. Now if the connector associated with the first set of contacts is busy, then as soon as relay 149 falls back the circuit of magnet 147 will again be closed from ground through wiper 141, springs 154 and 155, springs 152, springs 144, and relay 147 to battery through the release magnet. The relay 147 will again energize therefore to again close the circuit of the rotary magnet at springs 150 and step the wipers to the next set of contacts to be tested. This alternate operation of the relay 147 and magnet 149 continues until an idle trunk is found and the wiper 141 finds an ungrounded contact thereof, at which time no circuit will be closed for relay 147. The relay 156 has been held short circuited during the rotation of the switch over busy contacts and will now be energized when said short circuit is discontinued, the circuit for energizing relay 156 extending from ground through relay 63, winding of relay 156, springs 152, and relay 147 and magnet 148 to battery. Relay 156 is of such high resistance that it alone will energize over this circuit, and upon energizing, closes a pair of springs 157 in the circuit of the backbridge relay 158, extends the impulsing circuit from the springs of relay 64 to the magnets of the connector seized, through springs 135 and 159, closes a pair of springs 160 and 161 in the talking circuit to prepare for signaling, and closes the springs 154 and 162 in contact. For the purpose of this explanation the connection will be described as having been extended to the connector H (Fig. 3) although it will be understood that the selector G will, of course, select some other connector similar to H, as H is already busy. Now when the springs 154 and 162 of relay 156 are closed, a circuit is thereby closed for the relay 70 of the connector H (Fig. 3) in the same manner as by the relay 62 of the selector F. The magnet 80 of the connector will now be operated over a circuit extending from ground through springs 122 and 134, springs 126 and 127, springs 135 and 159, wiper 142, springs 72, springs 77 and 78, and relay 79 and magnet 80 to battery. The connector seized will be operated in the same manner as explained for the connector H when seized by the selector F to find and test the second called line, except that the control circuit passes to the backbridge relay 64 of the main selector instead of to the line relay 12 of said selector. As soon as the desired line is located, the connector will test for busy in the manner hereinbefore explained and if busy, then relay 96 closes the springs 99 to connect battery B through the resistance to operate relay 63 over the circuit including the wiper 141 of selector G.

Assuming the second called line to be idle, then as soon as the relay 101 energizes and closes the springs 107 and 108, a ringing circuit will be closed to the said second called station extending from battery through the upper winding of the ring cut-off relay 163, through springs 164 and 165, springs 160, wiper 139, springs 107, wiper 83, to and through the ringer of the second called station, wiper 84, springs 108, wiper 140, springs 161, springs 166 and 167, to the armature of the interrupter relay 114. The relay 114 operates to alternately connect the above ringing circuit to booster battery $B^2$ and generator R in the usual manner so that the instant the called subscriber responds to said signal the relay 163 will be energized to disconnect said ringing circuit. The relay 163, upon energizing, connects ground from springs 121 of relay 13 of selector F through springs 168 and 169 to one end of the lower winding of the back bridge relay 158 and through springs 168 and 169 and the springs 170 to the lower winding of relay 163, to lock said relay 163 energized. The closure of springs 166 and 171 and 165 and 172 connects the windings of the back bridge relay 158 across the called line. The relay 158 will therefore energize over the following path, ground through springs 168 and 169, lower winding of relay 158, springs 171 and 166, springs 161, wiper 140, springs 108, wiper 84, called substation, wiper 83, springs 107, wiper 139, springs 160, springs 165 and 172, springs 157, and upper winding of relay 158 to battery. The relay 158, upon energizing over this circuit, operates to close a circuit at springs 173 and 174 for the slow release relay 175. Relay 175 energizes to supply an additional ground to the winding of the reversing relay 15 through springs 176 and to prepare another circuit at springs 177 and 178. A further result of the energization of relay 158 is to close another point at springs 179 in a signaling circuit which indicates to the subscribers, both calling and called, that three parties are now across the line, and in case the calling party desires secret communication with either the first or second called parties she may wait until this tone leaves the connection. This tone is connected in a chain arrangement from the tone generating device M′ through contacts 125 of the back bridge relay 64 of the selector F through springs 179 of the back bridge relay 158 of selector G and thence to a conductor of the talking circuit, so that it will be disconnected as soon as either of the called parties hang up. It will be understood that this tone generated by the machine M′ is very low and does not interfere with conversation, so that the three parties may stay in on the connection if desired. The calling party may now talk to the second called subscriber over the heavy conductors shown extending from the trunk line 7—8 through the selector G and the connector H, or its duplicate.

If at this time the first called subscriber desires to withdraw from the connection, he may do so by simply restoring his receiver and leave the calling subscriber connected for conversation to the second called subscriber only. When the receiver at the first called station is restored, the circuit of the back bridge relay 64 of the selector F (Fig. 2) is opened in the usual manner. As relay 64 deenergizes a circuit is closed extending from ground through springs 122 and 134, springs 126 and 180, springs 118, springs 181 and 182, off-normal springs 49, and release magnet 54 to battery. The magnet 54 will therefore energize to release the main selector F and the connector H to normal in the manner explained, whereby the second called subscriber only is held in across the conductors 7 and 8.

After conversation has been completed with the second called subscriber, this connection may be released by the restoration of the receiver at the calling station. In this case the relay 12 will be deenergized in the usual manner to open the circuit of the release relay 31. Relay 31, upon deenergizing, closes a circuit from ground through springs 32 and 183, off-normal springs 143 of selector G, and release magnet 148 to battery. The magnet 148 will release the switch G to normal in the usual manner and also cause the release of the selected connector switch from the called line.

Should the calling subscriber have desired to only talk with the second called subscriber for a short interval and then again continue his conversation with the first called man, then the second called subscriber would be told to hang up as soon as desired. When the second called subscriber restores his receiver to the hook while the first called man is still in on the connection, then only the selector G and its associated connector switch will be released and the calling man will be left connected to the first called man as originally set up. When the second called man restores his receiver the circuit of back bridge relay 158 is opened by the switch hook. Relay 158 in turn opens the circuit of relay 175, which also deenergizes to close the following circuit; ground through spring 173 and its back contact, spring 177 and its back contact, springs 184, springs 119 and 120, springs 143 and release magnet 148 to battery.

Suppose now that the first subscriber has disconnected and restored the main selector switch to normal. Now if, after conversing with the second called subscriber for a time, the calling subscriber desires to be connected to still another or third called subscriber, she will make a request for such connection to the second called man. The second called man may then operate his calling device to control the magnets of the main selector through the medium of relays 158 and 175 in the same manner in which the magnets of the selector G were controlled by the first called subscriber through the medium of the relay 64.

It will be seen therefore that this transferring or extension of the call may be carried on indefinitely and that the calling subscriber may hold the trunk line 7—8 as long as desired and may be connected over said trunk line to as many as desired of the subscribers in the branch exchange successively or any two at once. Also that this scheme is arranged so that the connectors are very simple of construction and that many of the functions such as ringing, testing, etc. are taken from the connectors and applied to the selectors.

The selector repeater D (Fig. 1) is of that type used when a toll operator of the main exchange desires to seize the trunk line 7—8 to call a subscriber in the branch. I will describe the operation of the selector repeater D only in general as its circuits have been shown in other applications and is not the subject of my invention in this application, it being shown only to show more fully the adaptability of the dual selector arrangement such as employed at F and G, to a system in which long distance apparatus is used.

When the toll operator plugs into the jack of selector repeater D, an operating circuit is closed at springs 186 for the line relay 187. Relay 187 closes a circuit for release relay 188 at springs 189 and 190. Relay 188 prepares a circuit for the vertical magnet and connects ground to the supervisory lamp through springs 191. Relay 187 will now be operated to control the circuit of slow relay 192 and vertical magnet 193 in the usual manner to raise the wipers to a desired level. Relay 192 during this operation energizes relay 194 which in turn prepares a circuit for rotary magnet 195, when relay 192 falls back the circuit of rotary magnet 195 is completed and said magnet is then controlled by relay 194 to step the wipers on to an idle trunk line in the usual manner. When such idle trunk line is reached, the relay 196 will immediately energize to connect ground to the private wiper, lock itself energized, and switch the impulsing circuit from slow relay 192 and magnet 193 to the slow relay 197.

Now when the next series of impulses are delivered to relay 187, said relay operates to maintain relay 197 energized, and to close a repeating circuit to the trunk line 7—8 and thence to the line relay 12 of the main selector F at the springs 198. In this manner the impulses are repeated to the main selector to cause it to pick out an idle connector H in the manner before pointed out and to cause said connector to seize a desired called line. Now when such connection is completed and the relay 15 of the trunk line is operated to reverse the flow of battery in the trunk line, such reversal causes the electropolarized relay 199 to operate to close the series circuit of the repeating coil at springs 200 and to include the relay 201 in series with the relay 187 in the operating circuit. Relay 201 now remains energized and relay 187 falls back, so that the release magnet may now be controlled by relay 201. Should the called subscriber hang up too soon or the operator desire to re-ring the same, she will then operate the tuned relay 202 to ground one side of the trunk circuit extending to the selector F. This grounding of one side of the trunk causes the differential relay 13 of said selector F to energize and open, at the springs 121, the locking circuit for either the ring cut-off relay 109 or the relay 163. This causes either or both of said ring cut-off relays to deenergize to again start the automatic ringing in the usual manner. After the selector F at the branch exchange has been operated from the selector repeater D, it will be understood that the same extending or transferring operations may be carried out as when the selector was called from the straight repeater E.

As explained at one point in the description, the trunk line 7—8 is a two way trunk, that is, calls may be set up in either direction thereover. For this purpose the trunk line 7—8 is multiplied into the banks of outgoing selectors of the usual type in the branch exchange by means of conductors such as 203, 204, and 34. When a selector is operated to seize said conductors, a ground will be connected to conductor 34 to operate the cut-off relay 14. Relay 14, upon energizing, operates to disconnect the trunk line 7—8 from all connection with the selectors F and G. The connection may then be extended from the main exchange end of the trunk line by means of the rotary line switch $C^2$ in a well known manner.

It will be seen therefore that I have provided a very simple and efficient method of extending or transferring calls in a large automatic system and that said result is accomplished in a highly improved manner. Having fully described and ascertained the features and operation of my invention, what I consider to be new and desire to have protected by Letters Patent will be pointed out in the appended claims.

What I claim as my invention is:

1. In a telephone system, a trunk line, a pair of automatic switches associated with said trunk line, other automatic switches accessible to said pair of switches, means for seizing said trunk line, and for operating one of said pair of switches to seize one of said second switches, and for operating the seized second switch to extend a connection to a called line, connections whereby the other of said pair of switches may be operated over the connected called line to establish connection with a second called line, and a signal for indicating to the subscribers when the connection includes more than one called subscriber.

2. In a telephone system, main and auxiliary selector switches connected in pairs, connector switches accessible in common to said selector switches, means whereby a calling subscriber may operate one of said main selectors to extend a connection to a called line through one of said connector switches, means whereby the subscriber on the called line may operate the associated auxiliary selector to transfer the call to a second called line through a second one of said connector switches, and a signal for indicating to the subscribers when the connection includes more than one called subscriber.

3. In a telephone system, automatic selector switches, connector switches accessible thereto, means controlled by a calling subscriber for seizing a selector switch and for operating it to select one of said connector switches and for then operating said connector switch to find a called line and extend a talking connection thereto, together with means controlled from the called line over said extended connection for operating another selector switch and another connector switch to extend the talking connection to a second called subscriber while maintaining the talking connection between the calling party and the first called line.

4. In a telephone system, a trunk line, main and auxiliary selectors associated with said trunk line, a connector accessible to said selectors in common, means for operating either of said selectors to seize said connector to extend a connection to a called line, means for making the called line busy, a relay common to said selectors, and means in said connector responsive to the busy condition of said line for operating said common relay to connect a busy tone to the said extended connection.

5. In a telephone system, a pair of automatic switches, other switches accessible thereto, means controlled by a calling subscriber for seizing said switches, means for operating said switches alternately from called lines to extend connections to other called lines, through said other switches, a release magnet for each switch, means controlled by the calling subscriber for operating the release magnet of each switch, and means controlled over any connected called line for operating the release magnet of the associated switch only when the other of said switches is in connection with another called line.

6. In a telephone system, main and auxiliary selector switches connected in pairs, connector switches accessible in common to said selector switches, means whereby a calling subscriber may operate one of said main selectors to extend a connection to a called line through one of said connector switches, and means whereby the subscriber on the called line may operate the associated auxiliary selector to extend the call to a second called line through a second one of said connector switches while maintaining the original connection intact, thereby establishing a three party talking circuit.

7. In a telephone system, main and auxiliary selector switches connected in pairs, connector switches accessible in common to said selector switches, means whereby a calling subscriber may operate one of said main selectors to extend a connection to a called line through one of said connector switches, means whereby the subscriber on the called line may operate the associated auxiliary selector to extend the call to a second called line through a second one of said connector switches while maintaining the original connection intact, thereby establishing a three party talking circuit, and release mechanism in the main selector controlled by the subscriber on the first called line.

8. In a telephone system, main and auxiliary selector switches connected in pairs, connector switches accessible in common to said selector switches, means whereby a calling subscriber may operate one of said main selectors to extend a connection to a called line through one of said connector switches, means whereby the subscriber on the called line may operate the associated auxiliary selector to extend the call to a second called line through a second one of said connector switches while maintaining the original connection intact, thereby establishing a three party talking circuit, release mechanism in the main selector responsive to the replacement of the receiver at the station on the first called line, circuit arrangements such that the subscriber on the second called line can reoperate the main selector and a connector to extend the call to a third line, and release mechanism in the auxiliary selector controlled by the subscriber on the second called line.

9. In a passing call system, a pair of switches, a line and a release relay in each switch controllable by a called subscriber to pass a call, a release magnet in each switch, a ring-cut-off relay in each switch, and a circuit for each release magnet including contacts on the release relay of the same switch and the ring-cut-off relay of the other switch.

10. In a passing call system, a pair of switches, a line and a release relay in each switch controllable by a called subscriber to pass a call, a release magnet in each switch, a ring-cut-off relay in each switch, and a circuit for each release magnet controlled by the release relay of the same switch and by the ring-cut-off relays in both switches.

11. In a passing call system, a pair of switches, operating means in said switches under the control of called subscribers to pass calls, a release magnet in each switch, two circuits each having two branches extending to the release magnets of said switches, respectively, a release relay in one of said switches controlled by a called subscriber or closing one of said circuits at the undivided end thereof, and a similar release relay in the other switch for closing the other circuit at the undivided end thereof.

12. In a passing call system, a pair of switches, operating means in said switches under the control of called subscribers to pass calls, a release magnet in each switch, two circuits each having two branches extending to the release magnets of said switches, respectively, a release relay in one of said switches controlled by a called subscriber for closing one of said circuits at the undivided end thereof, a similar release relay in the other switch for closing the other circuit at the undivided end thereof, a third relay in one switch under called subscriber control to shift the branches of one pair separately into connection with the associated main circuit, and a fourth relay in the other switch under called subscriber control to shift the branches of the other pair separately into connection with the associated main circuit.

13. In a telephone system, automatic switching mechanism for extending a connection from a calling line to a called line, means including auxiliary switching equipment controlled by the subscriber on the connected called line for extending the connection to a second called line while maintaining the first connection, a signalling machine, and means for automatically connecting said machine to the calling line when the subscriber on the second called line answers the call.

14. In a telephone system, automatic switching mechanism for extending a connection from a calling line to a called line, means including auxiliary switching equipment controlled by the subscriber on the connected called line for extending the connection to a second called line while maintaining the first connection, a signalling machine, means for automatically connecting said machine to the calling line when the subscriber on the second called line answers the call, and means for automatically disconnecting said machine from the calling line responsive to the replacement of the receiver at the station on the first called line.

15. In a telephone system, automatic switching mechanism for extending a connection from a calling line to a called line, means including auxiliary switching equipment controlled by the subscriber on the connected called line for extending the connection to a second called line while maintaining the first connection, and signalling means for placing a faint tone on the talking connection so that each of the three connected subscribers will know that two others are involved in the connection.

16. In a telephone system, automatic switching mechanism for extending a connection from a calling line to a called line, means including auxiliary switching equipment controlled by the subscriber on the connected called line for extending the connection to a second called line while maintaining the first connection, means controlled by the subscriber on the second called line for extending the connection to a third called line in case the subscriber on the first called line hangs up, and signalling means for notifying the calling subscriber whenever two called lines are connected for conversation at the same time.

17. In a telephone system, an operator's switchboard, means including a plurality of selector switches and a final connector for extending a connection from said switchboard to a called line, an auxiliary selector paired with one of said first mentioned selectors, means under the control of the subscriber on the connected called line for operating said auxiliary selector and another connector to extend the established connection to a second called line, signalling means associated with said paired selectors, a ring-cut-off relay in each of said paired selectors for disconnecting the signalling means when the subscriber on a connected called line answers, a locking circuit for each relay, and means controlled by the operator at said switchboard for opening said locking circuits without releasing any connection which may be established.

18. In a telephone system, an operator's switchboard, means including a plurality of selector switches and a final connector for extending a connection from said switchboard to a called line, an auxiliary selector paired with one of said first mentioned selectors, means under the control of the subscriber on the connected called line for operating said auxiliary selector and another connector to extend the established connection to a second called line, signalling means associated with said paired selectors, a ring-cut-off relay in each of said paired selectors for disconnecting the signalling means when the subscriber on a connected called line answers, circuits for locking either ring-cut-off relay when operated to prevent its deenergization when the called party hangs up, and means controlled by the operator at said switchboard for opening, the locking circuit of either ring-cut-off relay when the same is locked in order to re-ring the called subscriber.

19. In a telephone system, an operator's switchboard, means including a plurality of selector switches and a final connector for extending a connection from said switchboard to a called line, an auxiliary selector paired with one of said first mentioned selectors, means under the control of the subscriber on the connected called line for operating said auxiliary selector and another connector to extend the established connection to a second called line, signalling means associated with said paired selectors, a ring-cut-off relay in each of said paired selectors for disconnecting the signalling means when the subscriber on a connected called line answers, circuits for locking either ring-cut-off relay when operated to prevent its deenergization when the called party hangs up, means controlled by the operator at said switchboard for opening the locking circuit of either ring-cut-off relay when the same is locked in order to re-ring the called subscriber, said unlocking means comprising a differential relay in series with the controlling line relay of one of said paired selectors, and another relay responsive to ringing current from said switchboard for grounding one conductor of the talking circuit to operate said differential relay.

20. In a telephone system, telephone lines, an automatic switch, means under control of a party on a calling one of said lines for operating the said switch to effect a connection to a first called one of said lines, means under control of the party on the said called line for directively extending a connection to a second called line from a point intermediate of the calling and the called lines whereby the calling line, the first called line and the second called line are in talking relation, and means operated upon a response on the second called line, dependent upon the first called line being connected, for applying a specific tone audible to the party on the second called line.

21. In a telephone system, telephone lines, an automatic switch, means under control of a party on a calling one of said lines for causing the operation of the said switch to effect a connection to a first called one of said lines, means for directively extending a connection to a second called line from a point intermediate of the calling and the called lines whereby the calling line, the first called line and the second called line are in talking relation, and means operated upon a response on the second called line, dependent upon the first called line being connected, for applying a specific tone audible to the party on the second called line.

22. In a telephone system, telephone lines, an automatic switch, means under control of a party on a calling one of said lines for operating the said switch to effect a connection to a first called one of said lines, means for directively extending a connection to a second called line from a point intermediate of the calling and the called lines whereby the calling line, the first called line and the second called line are in connective relation, means for disconnecting the first called line without disconnecting the second called line, and means operated upon a response on the second called line, dependent upon the first called line being still connected, for applying a specific tone audible to the party on the second called line to indicate the said connected condition.

23. In a telephone system, telephone lines, a trunk line, a tone source, the trunk line terminating in automatic switch mechanism, means for operating the switch mechanism to connect the trunk line with a first one of said lines, means controlled from the connected first line for introducing a second line into the connection, means controlled from the said first one of said lines to disconnect it from the connection before a response is made on the said second line, and means made effective dependent upon the said first line maintaining connection for automatically connecting to tone source audible on the said second line consequent upon a response thereon.

24. In a telephone system, telephone lines, a trunk line, a tone source, the trunk line terminating in automatic switch mechanism, means for operating the switch mechanism to connect the trunk line with a first one of said lines, means for operating the switch mechanism for introducing a second line into the connection, means for disconnecting the said first line from the connection before a response is made on the said second line, and means made effective dependent upon the said first line maintaining connection for automatically connecting the tone source audible on the said second line consequent upon a response thereon.

25. In a telephone system, telephone lines, a trunk line, a tone source, the trunk line terminating in automatic switch mechanism, means for operating the switch mechanism to connect the trunk line with a first one of said lines, means for operating the switch mechanism for introducing a second line into the connection, means for disconnecting the said first line from the connection before a response is made on the said second line, means made effective dependent upon the said first line maintaining connection for automatically connecting the tone source audible on the said second line consequent upon a response thereon, and automatic means for thereafter disconnecting the tone source.

26. In a telephone system, telephone lines, a trunk line, a tone source, the trunk line terminating in automatic switch mechanism, means for operating the switch mechanism to connect the trunk line with a first one of said lines, means for operating the switch mechanism for introducing a second line into the connection, means for disconnecting the said first line from the connection before a response is made on the said second line, means for disconnecting the said first line from the connection after a response is made on the said second line, and means dependent upon the said first line maintaining connection and then disconnecting after a response has been made on the said second line for automatically connecting the tone source to the said second line consequent to the said disconnection.

27. In a telephone system, three lines, a switch mechanism, a tone source, means for interlinking a connection between a first and a second of said lines, means for then connecting a third one of said lines with said second line to form a Y talking connection of the three lines upon a response occurring upon the said third line, means controlled from the said first line for disconnecting it from its connection before the said third line is connected with the said second line, and means automatically effective dependent upon the said first and second lines being maintained connected for causing the tone source to be applied audible to the third line consequent upon a response thereon.

28. In a telephone system, three lines, a switch mechanism, a tone source, means for effecting a connection between a first and a second of said lines, means for then connecting a third one of said lines with said second line to form a Y talking connection of the three lines upon a response occurring upon the said third line, means controlled from the said first line for disconnecting it from its connection before the response occurs on the said third line, and means automatically effective dependent upon the said first and second lines being maintained connected for causing the tone source to be applied audible to the third line consequent upon a response thereon.

In witness whereof, I hereunto subscribe my name this twentieth day of January, A. D. 1926.

EMIL JACOBSEN.